United States Patent [19]

Sabroff et al.

[11] Patent Number: 4,856,167
[45] Date of Patent: Aug. 15, 1989

[54] METHOD FOR PRODUCING NEAR NET RING GEAR FORGINGS

[75] Inventors: Alvin M. Sabroff; James R. Douglas, both of Mentor, Ohio

[73] Assignee: Eaton Corporation, Cleveland, Ohio

[21] Appl. No.: 14,426

[22] Filed: Feb. 12, 1987

[51] Int. Cl.4 .............................................. B23P 15/14
[52] U.S. Cl. ................................................... 29/159.2
[58] Field of Search ........................... 29/159.2; 72/68; 76/101 R, 101 A; 74/417, 423, 424, 713

[56] References Cited

U.S. PATENT DOCUMENTS

| 191,168 | 4/1943 | Singer | 29/159.2 |
| 1,670,758 | 5/1928 | Witherow | 29/159.2 |
| 2,058,007 | 10/1936 | Edelmeier | 29/68 |
| 2,713,277 | 7/1955 | Kaul | 72/359 |
| 2,964,838 | 12/1960 | Schober | 29/159.2 |
| 3,069,756 | 12/1962 | Colestock | 29/159.2 |
| 3,675,459 | 7/1972 | Dohmann | 29/159.2 |
| 3,731,516 | 5/1973 | Dohmann et al. | 29/159.2 |
| 4,048,419 | 4/1978 | Dittrich et al. | 72/68 |
| 4,433,568 | 2/1984 | Kondo | 29/159.2 X |
| 4,509,353 | 4/1985 | Ike et al. | 29/159.2 X |
| 4,672,729 | 6/1987 | Hoguchi et al. | 29/159.2 |

FOREIGN PATENT DOCUMENTS

| 829107 | 2/1960 | United Kingdom . |
| 1242713 | 8/1971 | United Kingdom ............... 29/159.2 |

Primary Examiner—P. W. Echols
Assistant Examiner—Andrew E. Rawlins
Attorney, Agent, or Firm—H. D. Gordon

[57] ABSTRACT

A method is provided for the production of near net ring gear forgings (106) including the steps of forging ring roll preforms (102) of substantially toroidal shape, ring rolling the preforms into forging blank rings (104) having a general rectangular shaped wall thickness and then precision forging said rings into near net ring gear forgings.

19 Claims, 10 Drawing Sheets

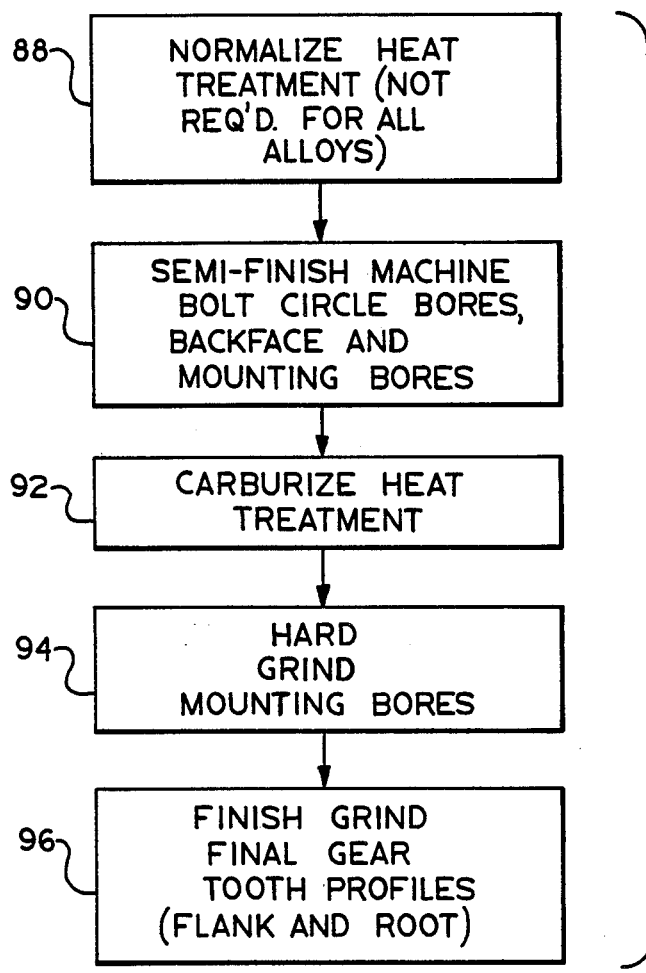

METHOD FOR PRODUCING NEAR NET RING GEAR FORGINGS

Related Applications

This application is related to application Ser. Nos. 14,428 and 14,429, both filed Feb. 12, 1987.

BACKGROUND OF THE INVENTION

1. Field of the Invention

This invention relates to a method for producing near net forgings for ring gears, especially ring gears of the hypoid, straight-bevel or spiral-bevel type for heavy-duty truck drive axles, from rolled ring shaped blanks produced by ring rolling of forged preforms.

2. Description of the Prior Art

Right angle drive trains for heavy-duty drive axles utilizing pinion gears/ring gear gear-sets are well known in the prior art, as may be seen by reference to U.S. Pat. Nos. 3,265,173; 4,018,097; 4,046,210; 4,050,534; 4,263,834 and 4,651,587, and to SAE Paper No. 841085, the disclosures of all of which are hereby incorporated by reference. Such gear-sets are usually of the well known spiral-bevel or hypoid gear type or some modification or derivative thereof.

Forging processes for the production of gear forgings/gear blanks having at least partially formed teeth are well known in the prior art, especially for relatively smaller sized bevel gears, such as differential pinion and side gears, as may be seen by reference to U.S. Pat. Nos. 3,832,763; 4,050,283 and 4,590,782, the disclosures of which are all hereby incorporated by reference.

The ring rolling process whereby generally annular rings are ring rolled from ring rolling preforms is also well known in the prior art as may be seen by reference to U.S. Pat. Nos. 1,971,027; 1,991,486; 3,230,370; 3,382,693; and 4,084,419, and to Metals Handbook, 8th Edition, Volume 5, American Society for Metals, Pages 106 and 107, "Ring Rolling", the disclosures of all of which are hereby incorporated by reference.

In the past, due to the relatively massive size, ring gears for heavy-duty trucks have been produced by a method comprising the forging of a gear blank having outer diameter flash and a center slug, trimming of the forged gear blank, a normalizing heat treatment of the trimmed gear blank, extensive machining of the gear blank to rough and then final cut gear teeth therein, other machining of surfaces and mounting bores, a carburizing heat treatment, a lapping operation wherein the ring gear and a pinion gear are rotated in meshing engagement in a lapping compound, and then maintaining the ring gear and pinion gear as a matched set to be used only in connection with one another.

While the prior art method for producing ring gears for heavy-duty trucks has been utilized for many years as have the ring gears and ring gear/pinion gear-sets produced thereby, this method is not totally satisfactory as the billets used therein are of a considerably greater volume than the finished ring gear representing undesirably high material and heating costs, cutting of the gear teeth from the gear blanks is an expensive and time consuming operation and teeth formed by a cutting process do not possess the desirable grain flow characteristics inherent in gear teeth formed by a material deformation process and thus do not provide the performance of formed gear teeth. Also, as the lapped ring gear/pinion gear gear-sets are only usable as a matched pair, great care must be taken to maintain the gear-sets in matched pairs and damage to either the ring gear or pinion gear will render the entire gear set useless.

The forging of hollow members from rolled rings to save material is generally known in the prior art. However, this process usually is economical only for high volume production because ring rolling of the blanks requires a forming operation (on a forge press or hammer) to produce the annular preform to be ring rolled. The material savings, and other savings associated therewith, were not sufficient to make such a method economically desirable, especially as to the relatively larger more costly ring gears, in the volume and variety of sizes and ratios associated with heavy-duty drive axles (i.e. drive axles utilized with heavy-duty trucks, off-the-road construction vehicles and the like). This was because prior art production of preforms, as with most other forging operations, had the conventional wisdom that the preform die must be filled to nearly one hundred percent (100%) of its theoretical capacity and thus each different sized preform would require a separate die and, for relatively small lots, the material savings would be more than offset by the additional preform tooling and press setups normally required.

SUMMARY OF THE INVENTION

In accordance with the present invention, the drawbacks of the prior art are overcome, or minimized, by the provision of a method for the production of drive axle ring gears for heavy-duty vehicles which is economical feasible in view of the relatively large size relatively low volume and relatively large variety of sizes and ratios associated with such heavy-duty drive axles. The method allows for considerable material and energy savings in view of the prior art methods, and eliminates the necessity for lapping of the ring gear with a mating pinion gear to produce a matched ring gear/pinion gear gear set and thereafter utilizing said ring gear only as a matched component to the pinion gear lapped therewith. Further, relative to the production of forged preforms to be ring rolled into rolled ring forging blanks, the necessity for providing an individual preform forging die for each different preform is eliminated.

In particular, the drawbacks of the prior art methods have been minimized by providing a precision forging process for precision forging relatively massive heavy-duty drive axle ring gear near net forgings from a carbon or alloy grade of gear steel, such as a carburizing grade of gear steel (such as AISI 8620A, 8622A, 8625A, 8822A or 9310A). The process allows the near net forgings to be produced having a more desirable combination of forging parameters such as microstructure, machinability, tool life, process labor, forging pressure required, and the like.

The above is accomplished by providing a forging process to produce precision near net heavy-duty drive axle ring gear forgings comprising the steps of providing a properly shaped and sized billet; heating the billet, preferably in atmospheric environment, to a predetermined temperature, forging the heated billet into a generally toroidal ring rolling preform, trimming the preform, ring rolling the preform to provide a rectangular walled forging ring blank, then precision forging the blank, preferably in the range of 1750° F. to 1950° F., into a near net heavy-duty drive axle ring gear forging. Preferably, the forging will have a microstructure permitting elimination of subsequent normalization operations.

Accordingly, it is an object of the present invention to provide a new and improved precision forging process for forging near net heavy-duty axle drive gear forgings from low to medium carbon level carbon and alloy steels.

This and other objects and advantages of the present invention will become apparent from a reading of the detailed description of the preferred embodiment taken in view of the drawings.

BRIEF DESCRIPTION OF THE DRAWINGS

FIGS. 4 and 4A, respectively, are schematic block diagrams of the metal deformation and post metal deformation portions, respectively, of the method of the present invention for producing ring gears for heavy-duty vehicle drive axles.

DESCRIPTION OF THE PREFERRED EMBODIMENT

Figure 1:
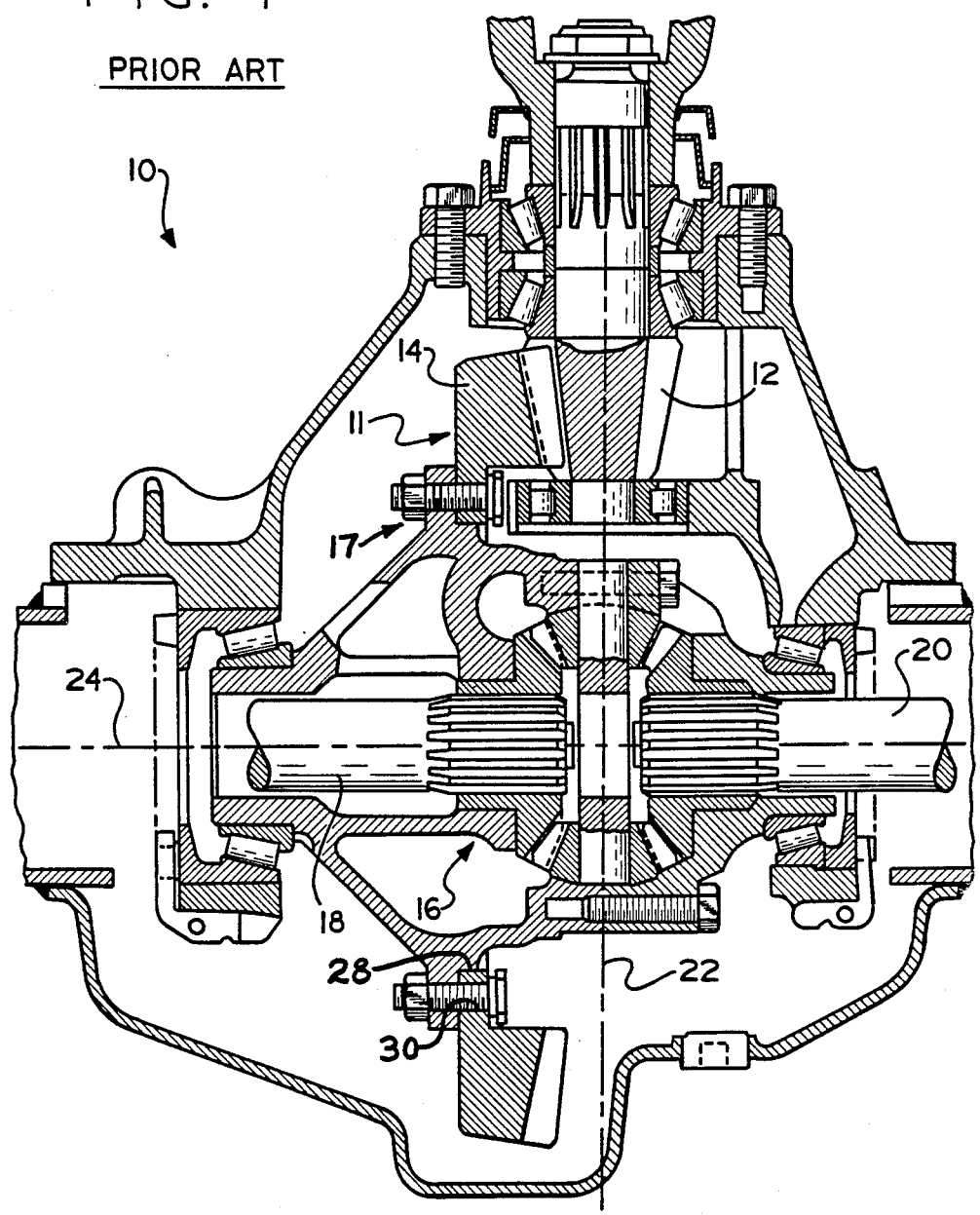
FIG. 1 is a partial sectional view of a typical prior art heavy-duty drive axle of the type utilizing rear gear/pinion gear drive gears.

In the following description of the present invention, certain terms will be utilized for purposes of reference only and are not intended to be limiting. The terms "upward", "downward", "rightward" and "leftward" refer to directions in the drawings to which reference is made. The terms "inward" and "outward", respectively, refer to directions toward and away from, respectively, the geometric center of the device described. Said terminology will include the words above specifically mentioned, derivatives thereof and words of similar import.

The method, and the forging die therefor, of the present invention involves a portion of a process for producing ring gears for heavy-duty vehicle drive axles. An essential feature of the process for producing such ring gears involves the precision forging of near net ring gear forgings from low to medium carbon level carbon and alloy steel (usually having a carbon content of 0.05% to 0.5% by weight) such as AISI 8620A, 8622A, 8625A, 8822A, 4817H and 9310A. The term "AISI" refers to the American Iron Steel Institute and the steel classification standards established thereby. However, the process of the present invention is not limited to any particular specific type of low to medium carbon level carbon and alloy steel.

As used herein, the term "precision forging" and derivatives thereof, will refer to a forging process (i.e. bulk deformation of a workpiece under pressure) capable of producing "net parts", i.e. part is usable as forged (subject to heat treating and other non-machining steps) or "near net parts", i.e. forgings usually requiring 0.030 inch or less of material removal from any functional surface.

The use of ring gear/pinion gear right angle gear-sets in the drive train of heavy-duty drive axles is well known in the prior art. Referring to FIG. 1, a single reduction drive axle 10 utilizing such a gear-set 11 comprising a pinion gear 12 meshingly engaged with a ring gear 14 is illustrated. A differential assembly 16 is fixed to the ring gear by bolts 17 for driving the two axle shafts 18 and 20. The axis of rotation 22 of the pinion gear 12 is substantially perpendicular to the axis of rotation 24 of ring gear 14 (and of differential assembly 16 and drive axles 18 and 20). Heavy-duty drive axles of this, and of the two-speed and the planetary double reduction type, are well known in the prior art and may be appreciated in greater detail by reference to above-mentioned U.S. Pat. Nos. 4,018,097 and 4,263,824 and allowed U.S. patent application Ser. No. 761,262, filed Aug. 1, 1985 and assigned to the Assignee of this invention.

Figure 2A:
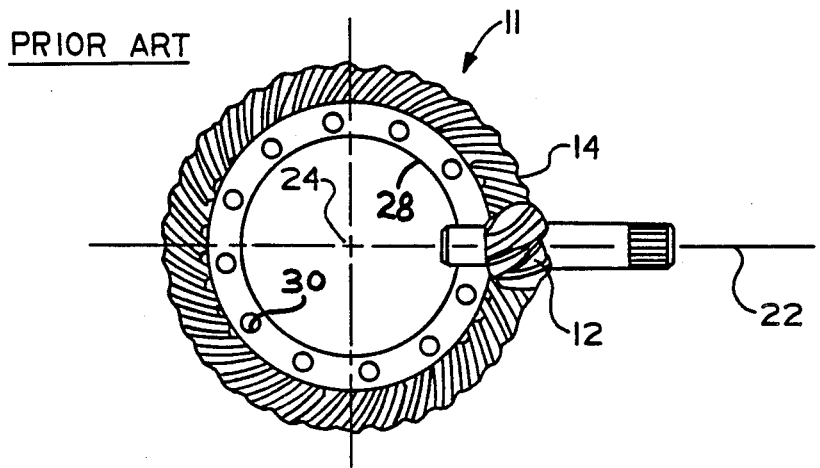
FIGS. 2A and 2B, respectively, illustrate prior art spiral bevel and hypoid, respectively, ring gear/pinion gear drive gears.
Figure 2B:
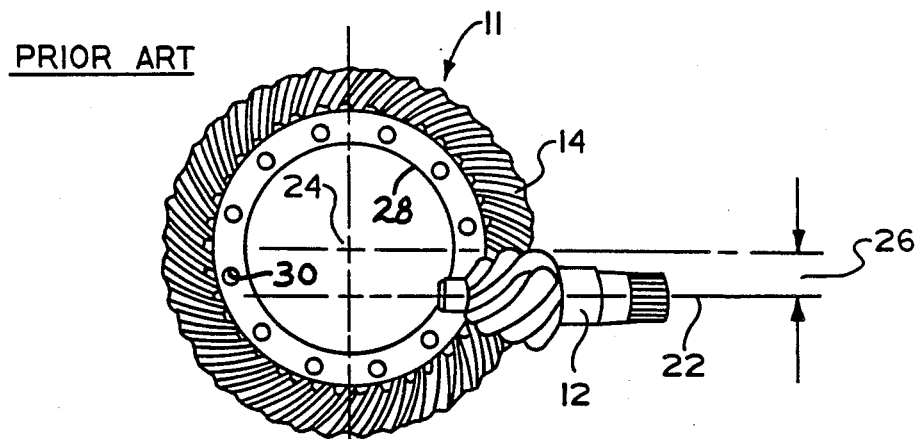

Most heavy-duty drive axles utilize right angle ring gear/pinion gear drive-sets of either the spiral bevel or hypoid type as illustrated in FIGS. 2A and 2B, respectively. The method of the present invention, and the forging die therefor, is intended for the production of spiral bevel and hypoid gearing and/or derivatives or modifications thereof. As may be seen, in a spiral bevel gear-set, FIG. 2A, the axes of rotation 22 and 24 are perpendicular and intersect while in a hypoid gear-set, FIG. 2B, the axes 22 and 24 are offset by a distance 26. The hypoid offset is usually about 1.00 to 2.00 inches, in a gear set having a twelve to eighteen inch pitch diameter ring gear. The ring gears 14 are provided with a mounting bore 28 for receipt of the differential assembly 16 and drive shafts 18 and 20, and a plurality of bolt circle bores 30 for receipt of the bolt and nut assemblies 17 for mounting of the ring gear to the differential assembly 16.

As is known, spiral bevel gears provide, in theory, a totally rolling, not sliding, gear contact at the pitch line whereas hypoid gear-sets can be smaller, but do have a greater degree of sliding gear contact at the pitch line. In recent years, with improvements in gear design and lubrication, sliding contact is not the major problem it once was and hypoid gear-sets for heavy-duty drive axles have become more accepted. The present invention will, for ease of explanation only, be illustrated in connection with a spiral bevel gear-set, it being understood that the present invention is equally well suited for both spiral bevel and hypoid gear-sets as well as modifications thereof. The features and advantages of spiral bevel and hypoid ring gear/pinion gear gear-sets are well known in the prior art as may be seen by reference to above-mentioned SAE Paper No. 841085.

Figure 3:
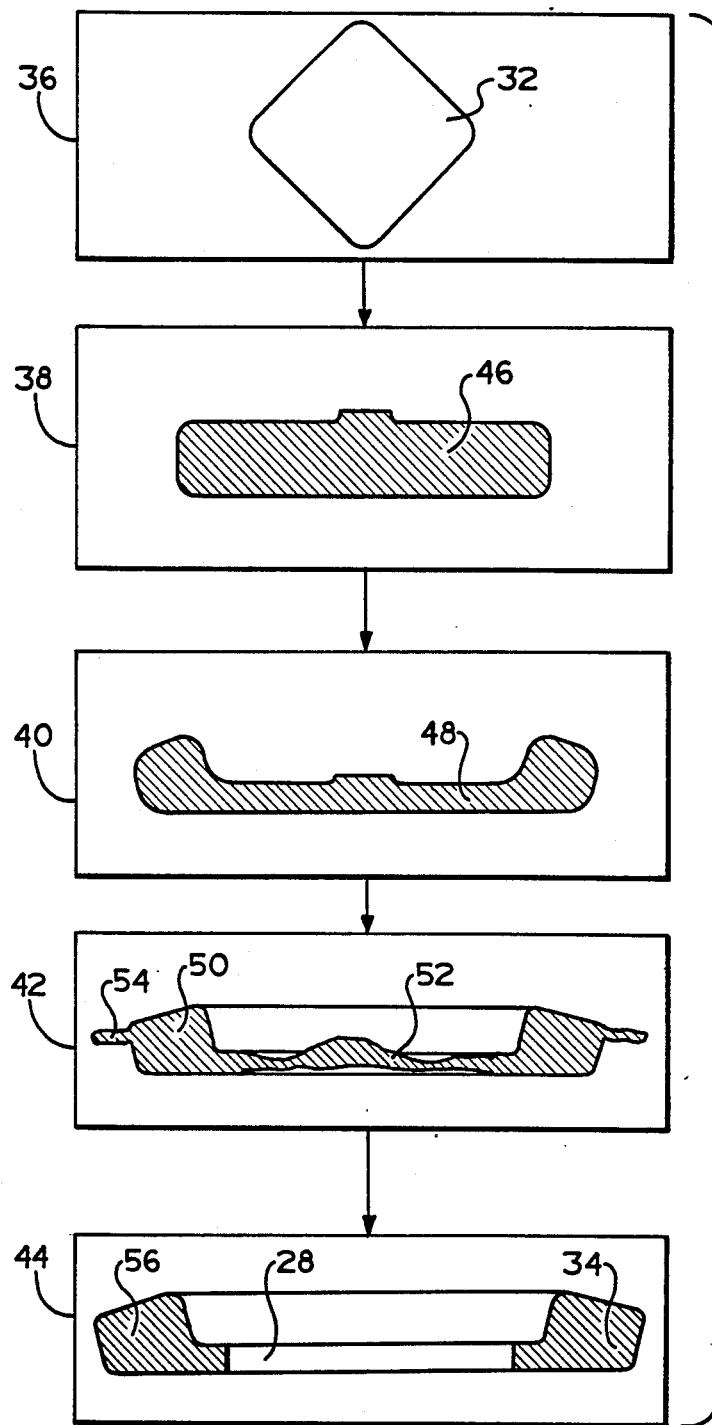
FIGS. 3 and 3A, respectively, are schematic block diagrams of the metal deformation and post metal deformation portions, respectively, of the prior art method for producing ring gears for heavy-duty vehicle drive axles.
Figure 3A:
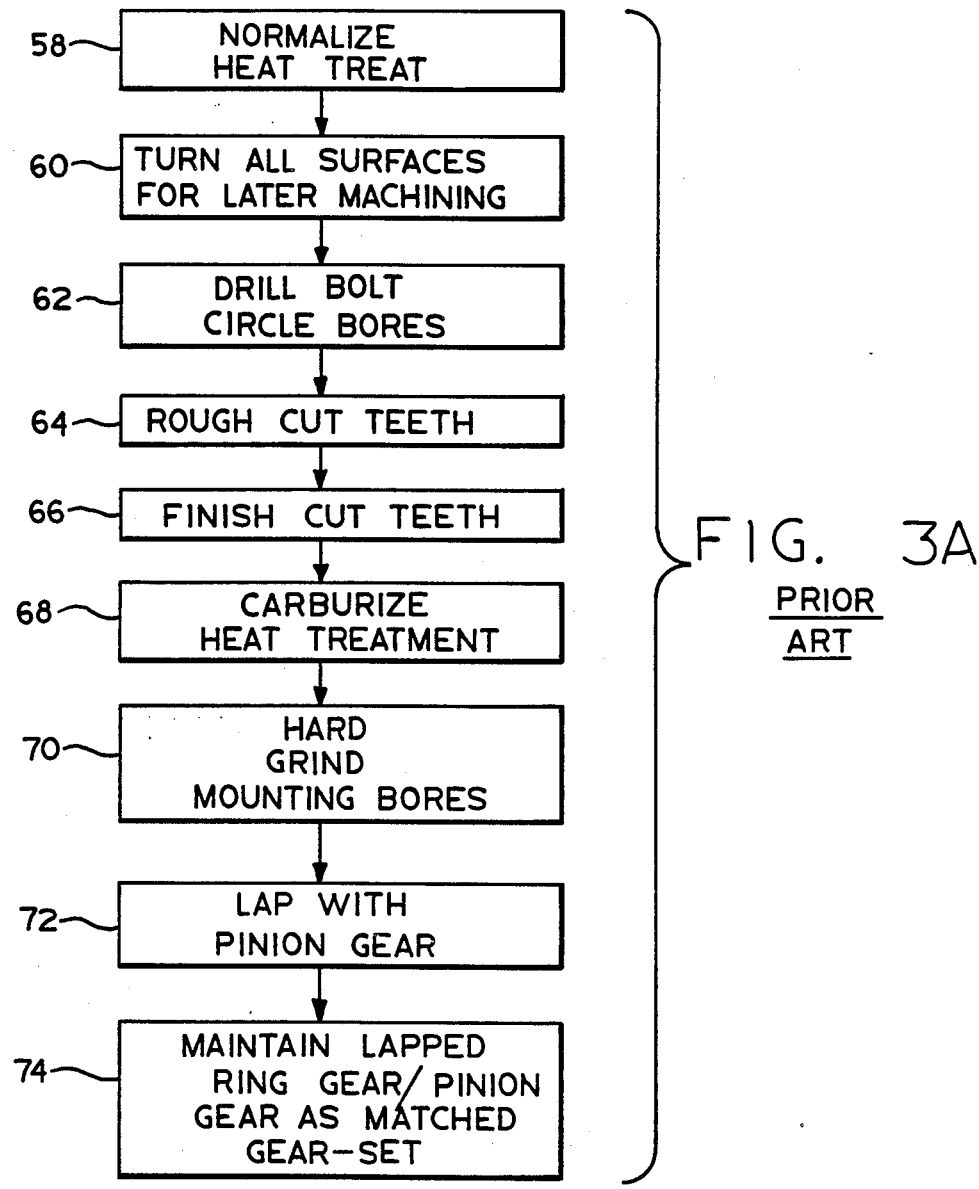
Figure 4:
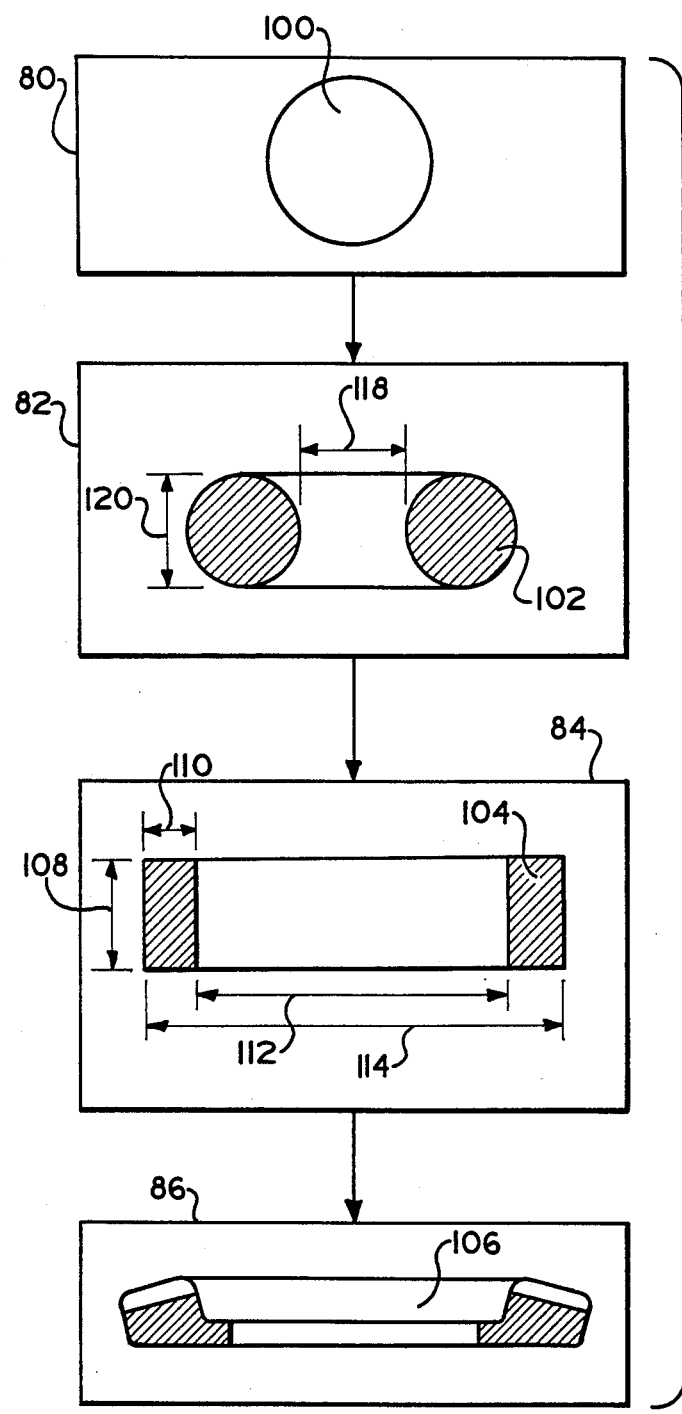

The most significant steps of the prior art process for producing heavy-duty vehicle drive axle ring gears 14 is schematically illustrated in block diagram form in FIGS. 3 and 3A. Briefly, the portion of the prior art process illustrated in FIG. 3 is that portion performed on the initial heated billet and comprises primarily deformation and trimming operations while that portion schematically illustrated in FIG. 3A illustrates the operations performed post metal deformation on the trimmed gear blank 34. It is noted that for both the prior art process illustrated in FIGS. 3 and 3A and the process of the present invention as illustrated in FIGS. 4 and 4A, the final ring gear 14 to be produced is comparable and has a weight of approximately 49.75 pounds.

The metal deformation portion of the prior art process includes the following sequential steps described in greater detail below: billet preparation and heating 36, upsetting or busting 38, blocking 40, forging of the gear blank 42, and trimming of the gear blank 44.

For purposes of description and comparison, the ring gear 14 to be produced by both the prior art method and the method of the present invention will be a single speed ring gear having an outer diameter of approximately sixteen and one-half (16½) inches and net weight of approximately 49.75 pounds and substantially identical specifications. The billet or slug 32 is cut out to a predetermined size and shape from bar stock of suitable gear material, namely a low to medium carbon level carbon or alloy steel. The billet 32 is then heated to a pre-selected appropriate forging temperature (normally about 2250°–2350° F.). To minimize scaling (oxidation) and depth of scaling of the heated billet, the billet is preferably heated as quickly as practical.

In the upsetting and blocking steps, 38 and 40, respectively, the heated workpiece is first upset to form a generally pancake shaped billet 46 to remove scale and is then blocked to form a forging preform 48. Steps 38 and 40 require separate blows of a press and, due to the relatively massive size of the workpiece, are not performed simultaneously. In the gear blank forging step 42, the forging preform 48 is forged into an untrimmed gear blank 50. It is noted that untrimmed gear blank 50 comprises a relatively large center slug portion 52 and a relatively large exterior flash portion 54 which is formed at the parting lines of the forging die as is well known in the art. In the trimming step 44 the center slug portion 52 and exterior flash 54 is trimmed from the gear blank to provide a trimmed gear blank 56. Gear blank 56 is not provided with any partially formed teeth.

While the desirability of forming forged gear blanks similar to 56 with at least partially formed gear teeth therein has been well known in the prior art, it has not been economically feasible by the conventional forging method illustrated in FIG. 3 due to the relatively massive size of the heavy-duty drive axle ring gears involved. The reason for this is the number of steps which would be involved, namely upsetting or busting, blocking to form a preform, finish forging, trimming and then the forging of teeth would involve such a large number of steps that the workpiece would lose too much of its heat (i.e. would become too cool), for proper forging of the teeth. This is especially true in view of the relatively larger surface areas of the workpiece in contact with the tooling as is well known in the prior art. Additionally, if teeth were formed after the busting and blocking steps, scale produced in these steps would result in unacceptable surface quality. Additionally, if an attempt was made to forge teeth into workpiece 56 in its relatively cool condition, the relatively large size of the required press and the relatively large pressures required for forging teeth at the relatively depressed temperature of the workpiece would quickly destroy tooling rendering the process further economically infeasible.

The remainder or post metal deformation system of the prior art process is schematically illustrated in FIG. 3A and includes the following sequential steps described in greater detail below; normalizing heat treatment 58, a surface turning operation 60, drilling of the bolt circle bores 62, rough cutting of the gear teeth 64, finish cutting of the gear teeth 66, a carburizing heat treatment of the workpiece 68, a finished machining operation 70, a lapping operation with a mated pinion 72 and a matched ring gear/pinion gear-set marking and gear-set maintenance procedure 74.

The trimmed gear blank, or workpiece, 56 is then subjected to a normalizing heat treatment to optimize metallurgical structure thereof in preparation for machining. A normalizing heat treatment of forged gear steels of the type involved typically comprises a heating, soaking and/or controlled cooling operation. After the normalizing heat treatment, all of the surfaces of the normalized gear blank are subject to a turning operation to provide proper surfaces for later locating and machining. In step 62, the bolt circle bores 30 are drilled into the mounting flange 76.

It is noted that throughout the description of the prior art method and the description of the method of the present invention that, for purposes of ease of description, portions of unfinished workpieces will be referred to by the same name and reference numeral as portions of the finished ring gear 14. By way of example, the center aperture of the trimmed gear blank 56 will be referred to as the mounting bore 28 although further machining is required until this central bore is of the exact dimensions of the mounting bore on the finished ring gear 14.

In operations 64, 66, respectively, teeth are cut into the workpiece in a rough cut and then finished cut procedure, respectively. The cutting of spiral bevel, hypoid and/or modified gear teeth is a well known procedure, and may be performed by gear cutting machinery sold by Gleason Works under the tradename "Gleason Generator" or by the Oerlikom Company and sold under the tradename of "Spiromatic". After the gear cutting operations, the workpieces are subjected to a carburizing heat treatment in step 68. As is known, a carburizing heat treatment involves a heating of the workpieces (usually to 1600°–1700° F.) in a high carbon atmosphere to cause a diffusion of carbon into the surfaces to harden the surfaces and provide hard, high carbon surfaces for improved wear of the finished product. After the carburizing heat treatment, the hardened workpiece is subject to a finish machining of the bolt circle and mounting bores, 28 and 30.

As the generated or cut gear tooth surfaces have been subject to a heat treatment after cutting of the tooth surfaces, even in a carefully controlled heat treatment process some distortion will result. Accordingly, to provide acceptable performance of the ring gear/pinion gear gear-sets, i.e. to provide the necessary surface quality, it is necessary that a carburized ring gear and pinion gear be subject to the lapping operation of step 72. In the lapping process, a matched set of ring gear and pinion gear are meshingly engaged and then rotated under a simulated load while a lapping compound is sprayed into the gear tooth mesh. Typically, the rotational axis 22 of the pinion gear is pivoted relative to the rotational axis 24 of the ring gear so that the proper surface treatment is provided to the entire tooth surfaces of both the ring gear and pinion. The lapping compound is a relatively fine abrasive suspended in a lubricant. Once lapped together, the lapped ring gear and pinion gear are a matched set, are only satisfactorily usable as a matched set and are only properly used or replaced as a pair. Accordingly, it is necessary that the matched set be marked as such and that great care be maintained to maintain the set. Usually, this requires special pallets and containers for the gear makers, axle assemblers and also at the location of servicing. The requirements for maintaining and utilizing the ring gear/pinion gear gear-sets only as a matched pair does, of course, involve additional expense. This is especially true for those types of gear-set designs wherein a common ring gear may be utilized with pinion gears having differing numbers of teeth as is disclosed in allowed U.S. Pat. No. 4,651,587 issued Mar. 24, 1987 and assigned to the Assignee of the present invention.

FIGS. 4 and 4A, respectively, illustrate the most significant steps of the metal deformation and post metal deformation portions, respectively, of the present invention for producing ring gears for heavy-duty vehicle drive axles. The process includes the following sequential steps, each of which will be described in greater detail below; preparation and heating of the billet 80, forging of a ring rolling preform 82, ring rolling a rolled ring forging blank 84, precision forging of a near net gear forging 86, a normalizing heat treatment which will not be required for many of the alloys expected to be used in connection with the present invention 88, a semi-finish machining operation 90, a carburizing heat treatment 92, a finished machining for the center and mounting bores 94 and a finish grinding of the final gear teeth profiles 96. As will be discussed in greater detail below, it is important to note that the finish grinding 96 of the final gear tooth profiles occurs after the final heat treatment 92 of the gear (and pinion) and thus the tooth profiles will not be subject to distortion in a subsequent heat treatment. If the pinion gears 12 are manufactured by a similar process, the necessity for a later lapping operation and for the necessity for utilizing the ring gears only in connection with a matched pinion is eliminated.

A billet or slug 100 is cut to a carefully controlled predetermined size and shape from bar stock of a carburizing grade of low to medium carbon level carbon and alloy steel which has been cleaned. Contrary to prior art practice of requiring cleaning by grinding, usually a centerless grinding or the like, of billets to be utilized for near net forgings, the present practice does not require cleaning as the ring rolling step 84 provides sufficient de-scaling as will be discussed in greater detail below. The billet or slug 100 is then heated to an appropriate temperature for the deformation operations illustrated in FIG. 4. It has been found that, due to the greatly minimized heat loss of the workpiece experienced in the present practice as opposed to the process illustrated in FIG. 3, that heating of a billet to an appropriate temperature in the range of 2000° F.–2300° F. is sufficient. It has also been found that for near net forgings of many of the alloys listed above, such as for example, AISA 8620A and 9310A, the normalizing heat treatment of step 88 is not required. Experience has shown that the process illustrated in FIG. 4, for certain of the alloys listed above, provides good machinability of the precision near net forgings as the microstructure is a polygonal ferrite and pearlite eqiaxed grain with no or only a minimum of, undesirable Widmanstatten structure. The grain size is generally fine (i.e. less than g.s. number 7 to 8 on the ASTM scale). Further, in view of the inherent de-scaling feature of the ring rolling process, heating of the billets for the precision forging of near net forging need not be in a controlled atmosphere.

The heated billet 100 is then forged into a trimmed ring rolling preform 102 having a generally toroidal shape in step 82. The details of forging the ring rolling preform symbolically illustrated by step 82 are illustrated in greater detail by reference to FIGS. 5, 6, 7 and 8, and will be discussed in greater detail below.

In step 84, the ring rolling preform 102 is ring rolled into a generally rectangular cross-sectional wall forging blank ring 104. The ring rolled forging blank ring 104 is then forged into a near net ring gear forging 106 in step 86.

Figure 10:
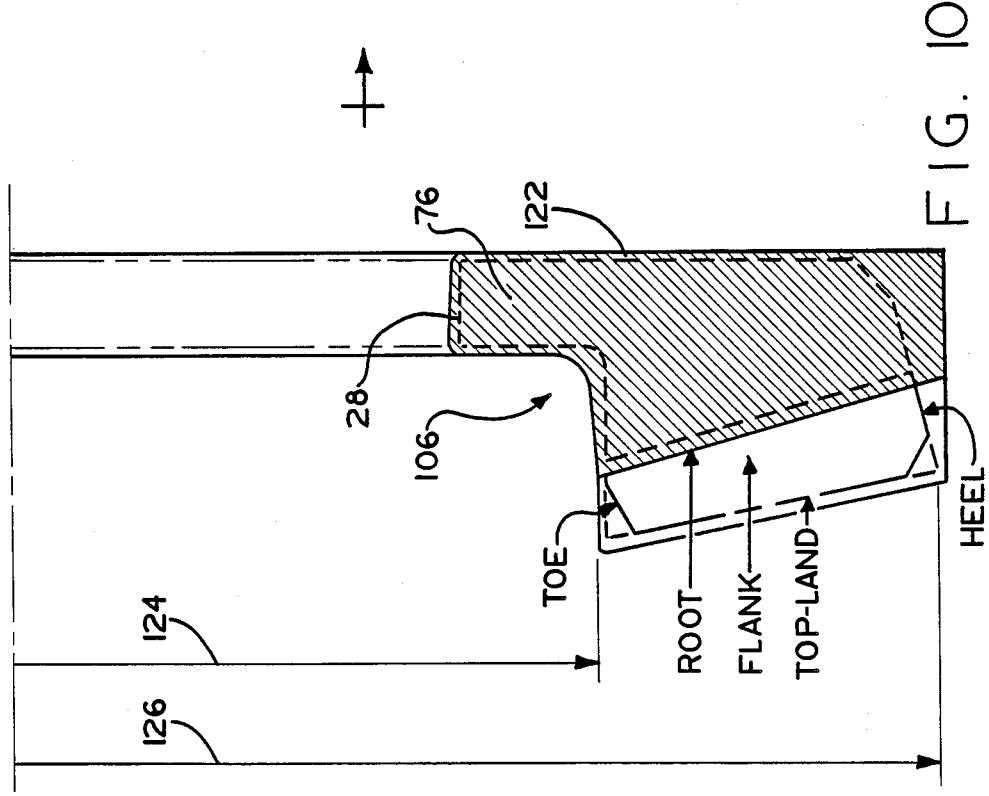
FIG. 10 is a cross-sectional view of the near net gear forging produced by the method illustrated in FIG. 4.

An enlarged view of the details of the near net ring gear forging 106 may be seen by reference to FIG. 10. As will be discussed below, the height 108, wall thickness 110, inner diameter 112 and outer diameter 114 of the rolled forging blank ring 104 are required to be of specific relationships relative to the near net ring gear forging 106. The dimensions of the rolled forging blank 104 will also determine at least in part, the dimensions of the ring rolling preform 102.

Figure 9:
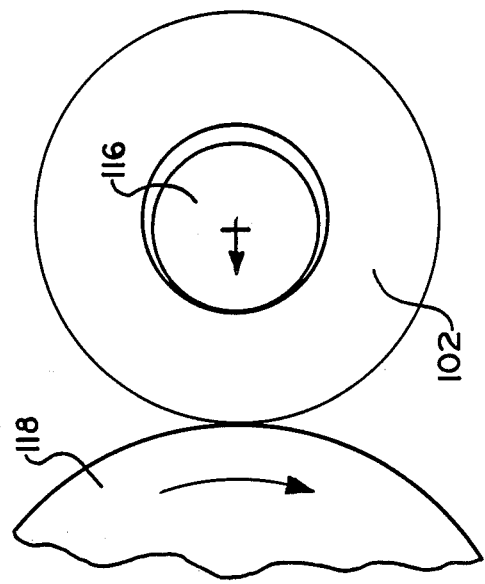
FIG. 9 is a schematic illustration of the ring rolling process portion of the method illustrated in FIGS. 4 and 4A.

The ring rolling process schematically illustrated at step 84 is well known in the prior art and may be appreciated by reference to FIG. 9. Briefly, the ring rolling preform 102 is placed over a rotatable mandrel 116 having an outer diameter slightly less than the inner diameter 118 of the preform. A relatively larger diameter king roll 118 will contact the outer diameter surface of the workpiece and will be rotatably driven to frictionally rotate the workpiece between the mandrel and the king roll. Either the king roll or the mandrel is then urged to move radially toward the other of the rolls to squeeze the workpiece therebetween. Ring rolling is relatively well known in 20 the prior art and may be seen by reference to above-mentioned U.S. Pat. Nos. 4,084,419; 3,382,693; 3,230,370; 1,991,486 and 1,971,027 and by reference to Metals Handbook, 8th edition, volume 5, American Society for Metals, pages 106 and 107 "Ring Rolling".

Two inherent features of the ring rolling process are important to consider. During the ring rolling process the height 120 of the preform will not be substantially increased, and thus the height 120 of the preform will equal the height 108 of the rolled forging blank ring 104. The ring rolling process inherently will de-scale the workpiece eliminating the necessity for a separate de-scaling busting operation and also the preform 102 and rolled ring 104 present a relatively small surface area in contact with the tooling and thus the ring rolling process represents a relatively minimal heat loss. The deformation heat generated may actually increase the temperature of the workpiece, allowing subsequent forging of a near net ring gear forging at the desired forging temperatures.

FIG. 4A illustrates the post metal deformation operations portion of the present invention. As stated above, certain alloys may require a normalizing heat treatment similar to that defined above for step 58 of the prior art process. Many of the alloy steels utilized in the present invention will not require such a normalizing heat treatment of the near net gear forging 106.

Referring to FIG. 10, the near net gear forging 106 produced by the precision forging step 86 to the present invention is illustrated. In the illustration of FIG. 10, that portion of the near net forging located outwardly of the dotted lines will require removal to produce the final ring gear 14.

The near net forging 106 is semi-finish machined to drill the bolt circle bores 28 in the mounting flange 76, the mounting bore 28 and the backface 122. Drilling of the bolt circle bores is identical to step 62 of the prior art method while semi-finish machining of the mounting bore 28 and backface 122 is required to provide locating surfaces for further machining. During the semi-finish machining operation 90, some machining may also be required at the face angle and/or toe bore, depending upon the quality of the near net forging 106. The semi-finish machining workpiece is then subject to a carburizing heat treatment 92 substantially identical to step 68 described in connection with the prior art process.

After the carburizing heat treatment of step 92, the bolt circle bores 30 and mounting bore 28 are finish machine in step 94.

The process is then completed by finish grinding of the root and flanks of the gear tooth profiles in step 96. As the grinding of the final tooth profiles occurs after the carburizing heat treatment, a preferred method of grinding is by cubic boron nitride ("CBN") grinding which provides a suitably economical form of grinding carburized metallic surfaces. It is a highly desirable feature of the present invention that the final gear teeth profiles are provided after the final heat treatment operation and thus the ground tooth profile surfaces will not be subject to any heat treatment related distortion. Accordingly, assuming a pinion gear produced by a similar process, the ring gear and pinion gear lapping operations and maintenance of a lapped ring gear pinion gear gear set as a matched set is not required.

As indicated above, the method of the present invention, as symbolically illustrated in FIGS. 4 and 4A, provides substantial material and related energy and handling savings as compared to the prior art method as illustrated in FIGS. 3 and 3A. By way of example, and of comparing the two processes to provide a substantially identical part (Eaton Corporation, Axle and Brake Division, Part No. 86374) the final product, ring gear 14, has a weight of approximately 49.75 pounds. The billet 32 utilized in the prior art process has a weight of approximately 103 pounds compared to the approximately 70 pound billet weight for billet 100 utilized in the process of the present invention. This does, of course, represent a material saving in excess of thirty percent (30%). Also, the weight of the untrimmed gear blank 52 will equal about 100 to 102 pounds (i.e. billet weight less weight of removed scale) as compared to the approximately 64 pound weight of the near net ring gear forging 106. Accordingly, it may be seen that a substantially lower capacity press may be utilized by the present invention which will substantially increase the usable life of the forging tooling. Further, by utilizing a ring shaped forging blank 104, a flashless or substantially flashless near net forging die may be utilized. By way of further comparison, the trimmed gear blank 56 produced by the prior art invention will have a weight of approximately 78.5 pounds compared to the approximately 64 pound weight of the near net forging 106 of the present invention giving an indication of the amount of metal to be removed in the rough cut and finish cut tooth cutting steps of the prior art method. Similar material savings, and related savings, on a percentage basis, have been demonstrated on both larger and smaller size heavy-duty drive axles ring gears produced by the method of the present invention.

In addition to material savings, the total process energy requirements, comprising the sum of: energy required for billet preparation, energy required for billet heating, forging energy, energy required for heat treatment after forging for proper machinability, the energy required for carburizing heat treatment, the energy required for post carburizing operations (lapping) and the energy required for machining, is at a minimal, or near minimal, level.

It is also noted that many of the gear-sets produced by the prior art methods require a shot peening or other tensile stress relief treatment after the carburizing heat treatment 68 to relieve the undesirable tensile stress in the carburized work pieces. In the present invention, shot peening or other tensile stress relief is not required as grinding, especially CBN grinding, tends to relieve tensile, and to induce desirable compressive, stress in the workpiece surfaces.

Referring to FIGS. 4 and 10, certain dimensional relationships of the rolled forging blank ring 104 relative to the dimensions of the precision forged near net ring gear forging 106 must be maintained for optimal utilization of the process of the present invention. It has been found, that to achieve satisfactory fill of the precision forging die and to produce a satisfactory near net ring gear forging 106, that the height 108 of the rolled forging blank ring 104 must be in the range of one (1) to four (4), preferably, one and one-half (1½) to two and one-half (2½), times as great as the wall thickness 110 of the forging blank ring 104. Further, to properly locate in the precision forging die, the inner diameter 112 of the forging blank 104 must be substantially equal to the toe bore 124 (also referred to as the pot diameter of the die) and the outer diameter 114 of the rolled forging blank ring 104 must be less than the outside diameter 126 of the near net ring gear forging 106.

As is known in the prior art, the grain flow characteristics of gear teeth formed by metal deformation, such as by forging, are more desirable than the grain flow characteristics of teeth formed by a metal cutting operation and are thus of superior performance as to bending fatigue and the like. It is believed that the desirable grain flow of gears produced by the method of the present invention is due mostly to the forming of teeth by metal deformation, however, it is also believed that this tendency is enhanced by the utilization of a ring rolled gear forging blank. Grain flow developed in the gear teeth by forging to shape improves both the impact and fatigue properties over gears produced by machining the teeth from a solid blank such as blank 56.

The precision forging process by which the near net ring gear forgings 106 are produced involves a flashless or substantially flashless forging die and thus the volume of the ring rolled forging blank 104 must be very carefully controlled. The ring rolling equipment can be utilized over a wide range of preforms to be rolled into forging blanks as the height 120 of the preform will determine the height 108 of the blank 104 and thus by controlling the separation between the mandrel 116 and king roll 118 the wall thickness 110 and diameter 114, can be varied as required. It is, however, extremely desirable that the preform required for each near net gear forging 106 not be of an entirely unique shape and not require a unique die for the forging thereof.

Applicant's have discovered, that so long as the height 108 of the rolled ring 104, and thus the height 120 of the forged preform 102, is within the range of one (1) to four (4), preferably one and one-half (1½) to two and one-half (2½), times the wall thickness 110 of the rolled ring, a very satisfactory precision forging operation can be obtained. Based upon this allowance, and applicant's discovery of a unique preform forging die cavity providing acceptable preforms of substantially toroidal shape provided the volume of the preform is within the range of one hundred percent (100%) to eighty percent (80%) of the theoretical maximum toroidal volume of the die, applicant has been able to forge a family of different weight preforms utilizing the same die.

Figure 5:
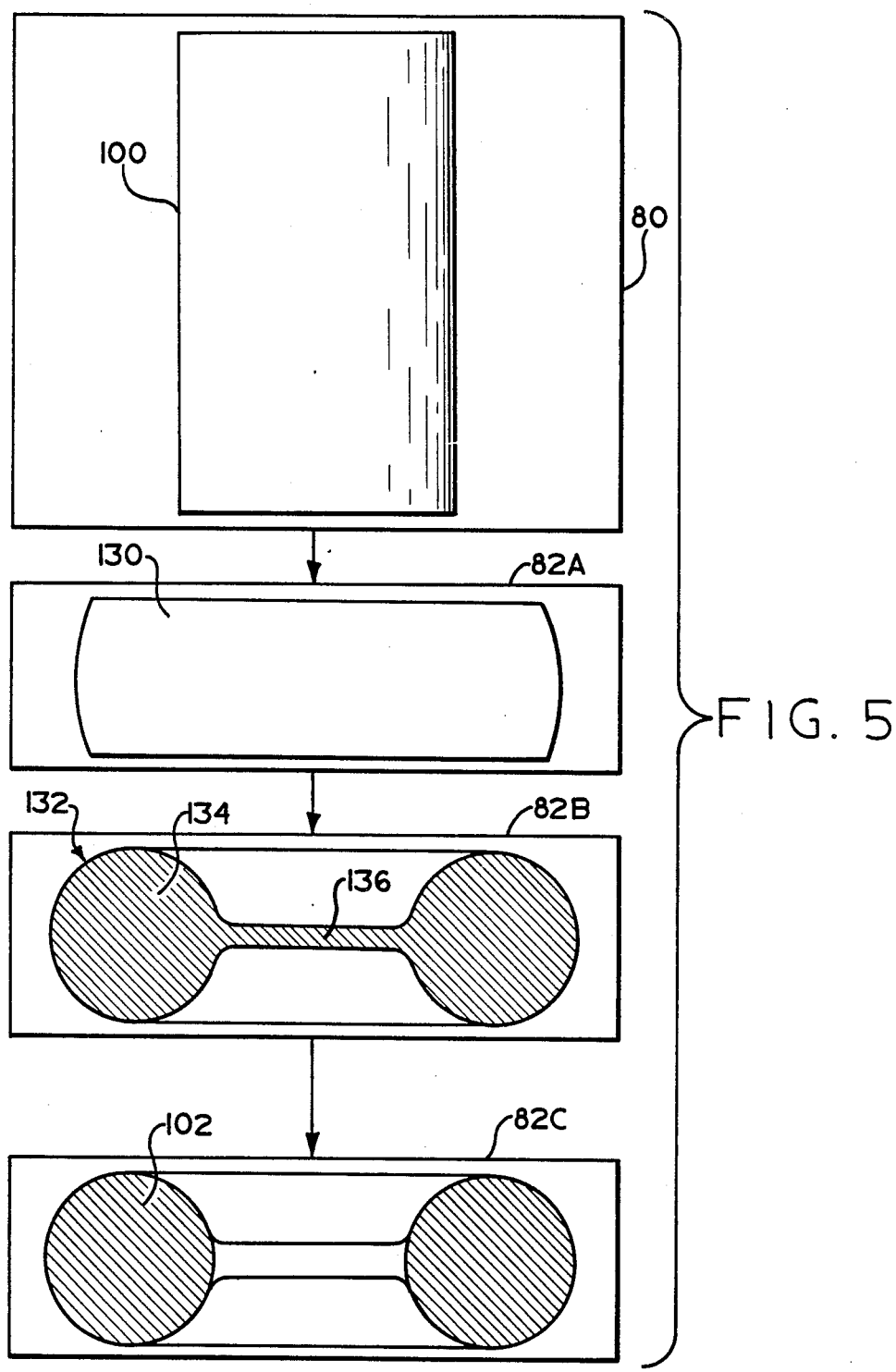
FIG. 5 is a schematic block diagram illustration of the ring rolling preform production portion of the method illustrated in FIGS. 4 and 4A.
Figure 6:
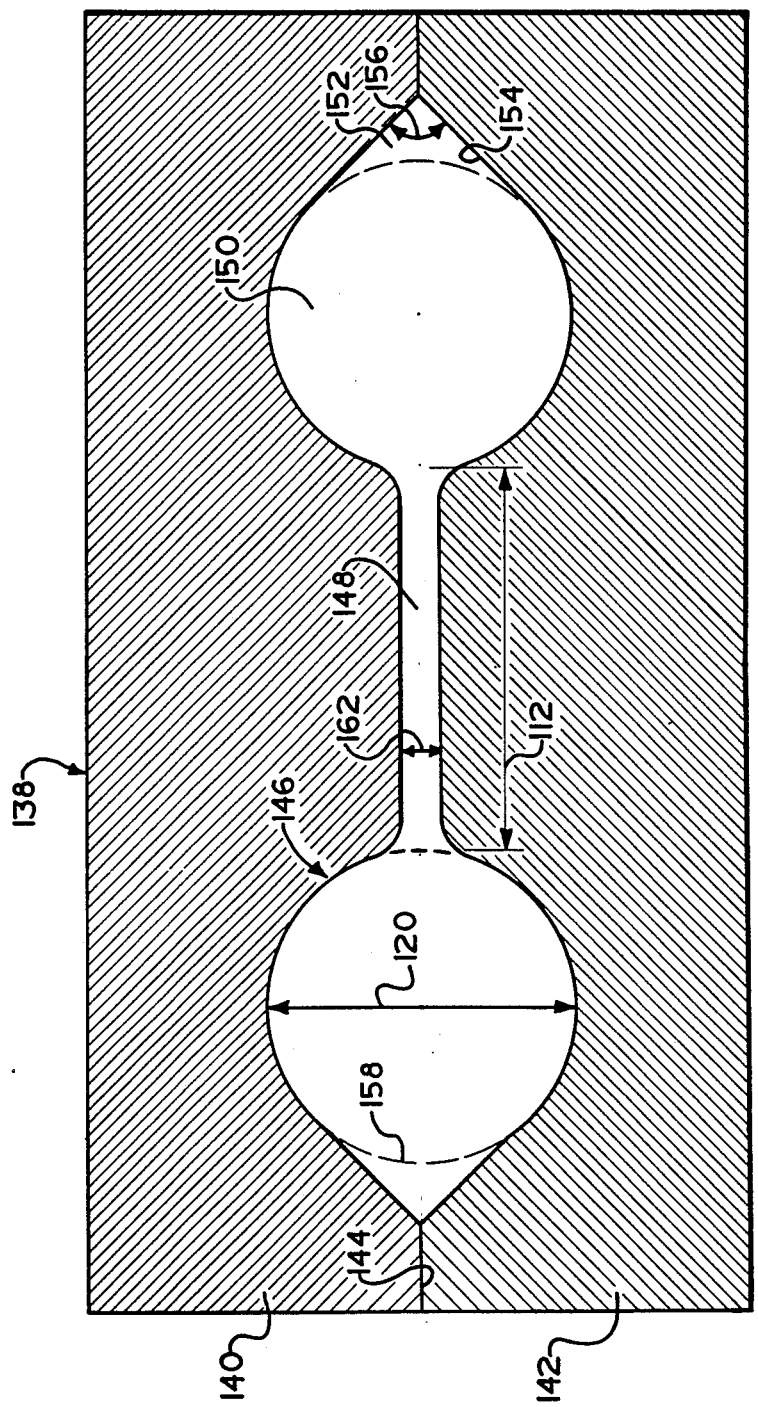
FIG. 6 is a schematic cross-sectional view of the forging die utilized in the method of the present invention to produce forged ring rolling preforms.
Figure 7:
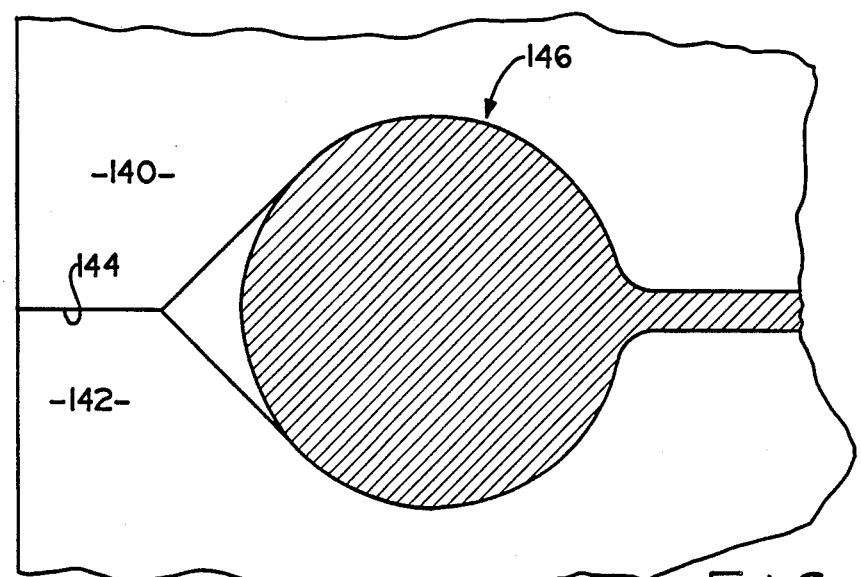
FIGS. 7 and 8, respectively, are enlarged cross-sectional schematic views of the forging die illustrated in FIG. 6, illustrating forging of preforms having approximately one hundred percent (100%) and eighty five percent (85%), respectively, of the theoretical volume of the preform forging die cavity.
Figure 8:
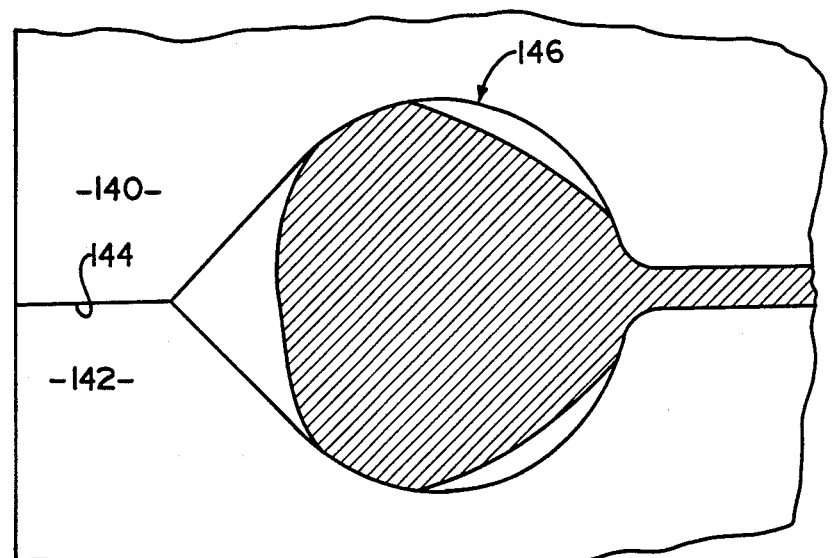

The process of the present invention is more fully illustrated referring to FIG. 5 which illustrates the further details of steps 80 and 82 of the process of the present invention, FIG. 6 which illustrates the unique die utilized therewith, and FIGS. 7 and 8 which illustrate the die as filled to one hundred percent (100%) and eighty percent (80%), respectively, of the theoretical volume thereof.

The shape of the trimmed ring rolling preform 102 is preferably substantially toroidal defining a substantially circular cross-section along any radius thereof. The substantially circular cross-section is important and highly desirable as the ring rolling process tends to create a ring having substantially rectangular cross-sectional walls and during this ring rolling process substantially round surfaces of the workpiece will tend to prevent the formation of fish-tail and material from being folded over, either of which would create a defect in the near net forging as is known in the art. Repeating, the generally annular cross-section of a generally toroidal preform minimizes the likelihood of defects as the ring rolling process tends to square up the surfaces, and the rounded surfaces are less likely to have any defects or folded over portions.

Referring to FIG. 5, in step 80 of the process of the present invention, the round or round cornered square billet 100 is heated as described above, and is then upset into a pancake shaped billet 130 as seen in step 82A. In step 82B, the pancake shaped billet 130 is forged into a untrimmed preform 132 comprising a generally toroidal or ring-shaped portion 134 and a center or slug portion 136, by using the unique preform forging die 138 illustrated in FIGS. 6, 7 and 8. In step 82C the center slug is trimmed from the untrimmed preform 132 to provide the forged preform 102 for the ring rolling process.

Preform forging die 138 comprises upper and lower portions 140 and 142 that mate together at a parting line 144 to define a die cavity 146 therebetween. Die cavity 146 includes a radially inward generally disc shape portion 148, a generally toroidal shaped portion 150 extending radially outwardly from the disc shape portion 148, and an annular generally triangular shaped overflow portion 152 extending radially outwardly from the generally toroidal shape portion 150 and defined by generally flat surfaces 154 extending radially outwardly and towards the parting line from a point tangent to the generally toroidal shape portion 150 and defining an included angle 156 therebetween. Included angle 156 is in the range of 75° to 105°. The radially outward boundary of the generally toroidal portion 150 is indicated by the dotted line 158 in FIGS. 6–8.

The theoretical volume of cavity 146 of preform forging die 138 is the volume of portions 150 and 148. The theoretical volume of the toroidal portion 150 of cavity 146 is defined by the volume of portions 150 and 148 minus the volume of portion 148 which will remain substantially constant Applicant's have discovered that toroidal shaped preforms having a volume of material which will fill the toroidal shaped cavity 150 of die 138 in the range of eighty percent (80%) (see FIG. 8) to one hundred percent (100%) (see FIG. 7) of the theoretical volume of cavity 150 will provide preforms having a cross-sectional shape sufficiently circular to allow ring rolled into rectangular wall ring shaped forging blanks without defects. This is due to the shape of the die cavities 150 and 152 which tend to force the billet material into a generally annular cross-section ring having relatively smooth circular surfaces and a height 120 equal to the height of the cavity 150. Of course, the disc shaped portion 148 of cavity 146 will have a diameter 112 equal to the inner diameter 112 of the ring rolling preform which is slightly greater than the outer diameter of the ring rolling mandrel 116. It is also noted that for proper material flow, the height 162 of the disc shaped portion 148 should be approximately ten percent (10%) of the diameter 112 thereof. Should the variety of ring gear preforms 106 to be manufactured by the method of the present invention require more than one preform die 138, the diameter 112 and thickness 162 of the disc shaped portion 148 will remain substantially constant for all of the dies required.

Accordingly, to determine if a ring rolling preform 102 to be first ring rolled into a ring and then precision forged into a near net ring gear forging 106 of given outer diameter 126, toe bore 124 and volume can be forged in a given preform die 138 having a toroidal cavity portion 150 of known theoretical volume and known height 120 (or circular cross-section diameter) the following criteria must be satisfied: the volume of the near net ring gear forging 106 must be no more than one hundred percent (100%) and no less than eighty percent (80%), preferably no less than eighty five percent (85%) of the theoretical volume of the toroidal cavity portion 150; and, a generally rectangular forging blank 104 of a volume equal to the volume of the near net forging 106 and of a height 108 equal to the height 120 of the cavity portion 150 and an inner diameter 112 generally equal to the toe bore 124 of the forging must be providable with an outer diameter 114 less than the outer diameter 126 of the forging and of a wall thickness 110 having a relationship to the height 108 such that the height is no less than one times the thickness and no greater than four, times the thickness (preferably the ratio will be in the range of 1.5 to 2.5) of the ring wall.

If the above criteria are met, a preform may be forged in the given die 138 which will provide a satisfactory ring shaped forging blank upon ring rolling thereof. By establishing this criteria and ranges, the necessity for providing a plurality of preform forging dies is substantially reduced without detracting from the quality of the precision formed near net gear forgings. The shape of the die cavity 146, including especially the toroidal portions and the generally flat sided overflow portions which will tend to cause material to move radially inwardly is important to the present invention. As may be seen from the above, the process of the present invention provides a new and highly desirable method for the production of ring gears for heavy-duty drive axles and in particular, for the forging of ring rolling preforms to be ring rolled into ring shaped forging blanks for precision forging to near net ring gear forgings of given dimension.

The above description of the preferred embodiment of the present invention is provided for illustrative purposes only and it is understood that the present invention is susceptible to modification, variation or change without departing from the spirit and the scope of the invention as hereinafter claimed.

We claim:

1. A method for producing near net ring gear forgings (106) having a known outside diameter (126), toe diameter (124) and volume, said process comprising the steps of:
   (a) providing properly sized and shaped billets (100) of a known low to medium carbon level carbon or alloy steel;
   (b) heating the billets (130) to an appropriate forging temperature;
   (c) forging the heated billets (130) in a preform (138) die having a generally toroidal shaped cavity (150) into untrimmed substantially toroidal shaped ring rolling preforms (132);
   (d) without reheating, trimming the untrimmed substantially toroidal shaped ring rolling preforms into trimmed substantially toroidal shaped ring rolling preforms (102);
   (e) without reheating, ring rolling the preforms into rings (104) having substantially rectangular cross-sectional walls of a given height (108) and thickness (110) such that the inner diameter (112) of said ring is substantially equal to the toe diameter, the outer diameter (114) of said ring is less than said outside diameter and the height of said rings is in the range of one (1) to four (4) times the wall thickness thereof; and,
   (f) without reheating, precision forging said rings into near net ring gear forgings.

2. The method of claim 1 including the further step of machining at least one surface of said near net ring gear forging, all of the machining of said near net ring gear forging without subjecting said near net ring gear forging to any normalizing heat treatment operation.

3. The method of claim 1 wherein said precision forging is a single blow operation.

4. The method of claim 2 wherein said precision forging is a single blow operation.

5. The method of claim 3 wherein the billets are heated, in atmosphere, to a temperature in the range of 2000° F. to 2300° F. and the precision forging of the rings is at a temperature in the range of 1750° to 1950° F.

6. The method of claim 4 wherein the precision forging of the rings is at a temperature in the range of 1750° to 1950° F.

7. The method of claim 1 wherein said untrimmed preform has a center slug therein and said trimming operation comprises removal of said center slug only, the volume of said billet equaling approximately the volume of said near net ring gear forging plus the volume of said center slug.

8. The method of claim 1 wherein the volume of said near net ring gear forging is in the range of 100% to 80% of the volume of said toroidal cavity portion of said die.

9. The method of claim 1 wherein the volume of said near net ring gear forging is in the range of 100% to 85% of the volume of the toroidal cavity portion of said die.

10. The method of claim 7 wherein said ring rolling occurs on a ring rolling machine having a mandrel of a given outer diameter, said center slug portion having an outer diameter slightly greater than the outer diameter of said mandrel.

11. The method of claim 10 wherein the thickness of said slug is about 1/10 the outer diameter thereof.

12. The method of claim 1 wherein the height of said ring is in the range of one and one-half (1½) to two and one-half (2½), times the wall thickness thereof.

13. The method of claim 2 wherein the height of said ring is in the range of one and one-half (1½) to two and one-half (2½), times the wall thickness thereof.

14. The method of claim 3 wherein the height of said ring is in the range of one and one-half (1½) to two and one-half (2½), times the wall thickness thereof.

15. The method of claim 5 wherein the height of said ring is in the range of one and one-half (1½) to two and one-half (2½), times the wall thickness thereof.

16. A method for producing near net ring gear forgings having a known outside diameter, toe diameter and volume, said process comprising the steps of:
   (a) providing by a process including ring rolling of heated ring rolling preforms, rings having substantially rectangular cross-sectional walls of a given height and thickness such that the inner diameter of said ring is substantially equal to the toe diameter, the outer diameter and the height of said rings is in the range of one (1) to four (4) times the wall thickness thereof; and
   (b) without reheating, precision forging said rings into near net ring gear forgings.

17. The method of claim 16 wherein said precision forging is a single blow operation.

18. The method of claim 16 wherein the height of said ring is in the range of one and one-half (1½) to two and one-half (2½), times the wall thickness thereof.

19. The method of claim 17 wherein the height of said ring is in the range of one and one-half (1½) to two and one-half (2½), times the wall thickness thereof.

* * * * *